United States Patent
Skillermark et al.

(10) Patent No.: US 11,617,224 B2
(45) Date of Patent: Mar. 28, 2023

(54) GATEWAY, A FRONTEND DEVICE, A METHOD AND A COMPUTER READABLE STORAGE MEDIUM FOR PROVIDING CLOUD CONNECTIVITY TO A NETWORK OF COMMUNICATIVELY INTERCONNECTED NETWORK NODES

(71) Applicant: Telefonaktiebolaget LM Ericsson (publ), Stockholm (SE)

(72) Inventors: Per Skillermark, Årsta (SE); Thomas Rimhagen, Linköping (SE); Jingcheng Zhang, Svärtinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/970,207

(22) PCT Filed: Feb. 15, 2018

(86) PCT No.: PCT/EP2018/053791
§ 371 (c)(1),
(2) Date: Aug. 14, 2020

(87) PCT Pub. No.: WO2019/158201
PCT Pub. Date: Aug. 22, 2019

(65) Prior Publication Data
US 2021/0136865 A1    May 6, 2021

(51) Int. Cl.
*H04W 84/18* (2009.01)
*H04L 12/66* (2006.01)
(Continued)

(52) U.S. Cl.
CPC ............. *H04W 84/18* (2013.01); *H04L 12/66* (2013.01); *H04W 4/06* (2013.01); *H04W 80/02* (2013.01); *H04W 88/06* (2013.01)

(58) Field of Classification Search
CPC ....... H04W 84/18; H04W 4/06; H04W 80/02; H04W 88/06; H04L 12/66; H04L 67/2833; H04L 69/08; H04L 67/28
(Continued)

(56) References Cited

U.S. PATENT DOCUMENTS 9,705,803 B1 * 7/2017 Oroskar ................ H04W 8/04
2004/0076158 A1 * 4/2004 Okubo .................. H04L 45/00
                                                  370/392
(Continued)

FOREIGN PATENT DOCUMENTS

| KR | 1856486 B1 * | 5/2018 | ......... G06F 12/0246 |
| WO | WO-2005076564 A1 * | 8/2005 | ............. H04L 63/08 |
| WO | WO-2012171451 A1 * | 12/2012 | ........... H04L 12/189 |

OTHER PUBLICATIONS

International Search Report and the Written Opinion of the International Searching Authority, issued in corresponding International Application No. PCT/EP2018/053791, dated Aug. 1, 2018, 16 pages.
(Continued)

*Primary Examiner* — David R Lazaro
*Assistant Examiner* — Berhanu Shitayewoldetadik
(74) *Attorney, Agent, or Firm* — Rothwell, Figg, Ernst & Manbeck, P.C.

(57) ABSTRACT

A gateway (1), arranged for providing cloud connectivity to a network of communicatively interconnected network nodes. The gateway (1) comprises a backend function (2) and a plurality of physical frontend devices (3), for deployment in the network. The frontend devices (3) communicatively connect (4) to the backend function (2) for exchanging messages between a network node and the backend function (2). The backend function (2) is common to the plurality of frontend devices (3) and arranged in a at least one server of a plurality of operatively connected servers, that may form
(Continued)

part of the cloud, thereby providing for 'cloud processing' or 'virtual processing' of the messages for exchange thereof with the cloud. The physical frontend devices (3) may be designed to comprise transceiver functionality.

18 Claims, 3 Drawing Sheets

(51) Int. Cl.
  *H04W 4/06* (2009.01)
  *H04W 80/02* (2009.01)
  *H04W 88/06* (2009.01)
  *H04L 15/16* (2006.01)
  *G06F 15/16* (2006.01)
(58) Field of Classification Search
  USPC .......................................................... 709/223
  See application file for complete search history.

(56) References Cited

U.S. PATENT DOCUMENTS

| | | | | |
|---|---|---|---|---|
| 2006/0146991 | A1* | 7/2006 | Thompson | H04L 51/214 379/67.1 |
| 2010/0146328 | A1* | 6/2010 | Yochai | G06F 11/2028 711/E12.019 |
| 2010/0296481 | A1* | 11/2010 | Weniger | H04L 63/1466 370/328 |
| 2011/0202845 | A1* | 8/2011 | Mountjoy | H04N 21/816 715/733 |
| 2013/0268689 | A1* | 10/2013 | Leucht-Roth | H04L 1/0079 709/232 |
| 2014/0123157 | A1* | 5/2014 | Keskitalo | G06F 3/0484 719/328 |
| 2014/0226481 | A1* | 8/2014 | Dahod | H04W 72/04 370/328 |
| 2015/0311948 | A1* | 10/2015 | Hui | H04W 84/18 375/133 |
| 2016/0191672 | A1* | 6/2016 | Perlman | H04L 12/4633 370/474 |
| 2016/0219117 | A1* | 7/2016 | Marlatt | H04L 41/0816 |
| 2016/0302212 | A1* | 10/2016 | Chowdhury | H04W 72/085 |
| 2017/0034048 | A1* | 2/2017 | Karandikar | H04L 45/304 |
| 2017/0063649 | A1* | 3/2017 | Kirner | H04L 41/0893 |
| 2017/0086111 | A1* | 3/2017 | Vrzic | H04W 36/023 |
| 2017/0163755 | A1* | 6/2017 | Slocombe | H04L 67/568 |
| 2017/0280474 | A1* | 9/2017 | Vesterinen | H04L 41/50 |
| 2017/0295517 | A1* | 10/2017 | Nguyen | H04W 8/22 |
| 2017/0302754 | A1* | 10/2017 | Busatta | H04L 67/563 |
| 2017/0302756 | A1* | 10/2017 | Chou | H04L 67/565 |
| 2018/0310207 | A1* | 10/2018 | Dahod | H04W 72/04 |
| 2019/0068719 | A1* | 2/2019 | Schmidli | G06F 9/542 |
| 2019/0069248 | A1* | 2/2019 | Singh | H04W 52/0296 |
| 2021/0092647 | A1* | 3/2021 | Yang | H04W 28/24 |

OTHER PUBLICATIONS

Ericsson White Paper, "Cloud Ran", Uen 284 23-3271, Sep. 2015, 11 pages.

* cited by examiner

GATEWAY, A FRONTEND DEVICE, A METHOD AND A COMPUTER READABLE STORAGE MEDIUM FOR PROVIDING CLOUD CONNECTIVITY TO A NETWORK OF COMMUNICATIVELY INTERCONNECTED NETWORK NODES

CROSS REFERENCE TO RELATED APPLICATION(S)

This application is a 35 U.S.C. § 371 National Phase Entry Application from PCT/EP2018/053791, filed Feb. 15, 2018, designating the United States, the disclosure of which is incorporated herein by reference in its entirety.

TECHNICAL FIELD

The present disclosure generally relates to telecommunications and, in particular, to a gateway, a gateway frontend device and a method for providing cloud connectivity, such as Internet connectivity, for a network of communicatively interconnected network nodes, for example a wireless mesh network. The present disclosure further relates to a computer readable storage medium comprising computer program code instructions for configuring one or a plurality of servers for providing gateway functionality for operating the method.

BACKGROUND

Wireless mesh networks, Wireless Personal Area Networks, WPANs, or in general networks comprised of a plurality of communicatively interconnected network nodes, provide deployment flexibility and are scalable to support a large number of communication devices, either mobile or movable and non-mobile or stationary communication devices, such as user equipment for mobile telephone and data communication, Customer-Premises Equipment, CPE, and Internet of Things, IoT, devices, for example. The term network node is generic for all such devices.

The network generally comprises multiple network end nodes and network relay nodes, such as bridges, switches and other electric infrastructure devices. Dependent on the network communication protocol, messages in a mesh network are routed along a specific path from source to destination by hopping from node to node, or use is made of the so-called message flooding, wherein a message on its way from source to destination is rebroadcasted at least once by each node or relay, or more than once, for example by a subset of the nodes, in accordance with an intelligent control algorithm, also called managed flooding.

As there is often more than one path between a source and a destination in the network, i.e. multi-path redundancy, mesh topologies are robust against node failures, and may continue to function even when individual nodes of the network stop operating. Although mostly used in wireless situations, this concept can also apply to wired networks or combinations of wired and wireless networks.

Some networks are configured to provide support for low-power operations or features, such that constrained network nodes can operate for years on a small coin-cell battery, for example. For these and other reasons, low-power mesh networks are often used in wireless sensor and actuation networks, in which many network nodes are deployed to collect data or to exercise control over certain mechanisms or sub-systems. Networks of communicatively interconnected network nodes that support low-power operation are known in practice as Zigbee™, Thread™ and Bluetooth Mesh™, for example.

For many applications, it is often required to send data out from or into the mesh network, for example data to be exchanged with the Internet, a telecommunication core system, or any other pool of shared configurable data processing or data computing and data storage resources, inn the information technology also designated by the tem 'cloud' or 'cloud computing' or 'cloud processing' or 'virtual computing' or 'virtual processing'. In the present description and the claims the term 'cloud' is used as a general reference to the Internet, a telecommunication core system or any other data communication system external to the network of communicatively interconnected network nodes.

Sensor nodes may report measurement data to an application running in the cloud, and actuator nodes may receive command messages from the same or an other cloud application. Such communication is typically exchanged via gateways, which provide cloud connectivity to the network. For redundancy reasons, and in large mesh networks, it is often advisable to deploy multiple gateways such that the cloud connectivity is not dependent on the availability of a single gateway. Using multiple gateways also provides means for load sharing inside the mesh network.

Messages that are generated in a network end node, and sent to a gateway, are generally referred to as uplink messages or uplink traffic. Similarly, messages that are sent from a gateway to a network end node are referred to as downlink messages or downlink traffic.

In multi-gateway deployments, some gateway selection mechanism is required. Uplink traffic can be sent to a specific gateway, or multi-casted to multiple (sometimes all) gateways. The latter can, for example, be realized using a publish-and-subscribe message exchange model, in which network end nodes are configured to publish uplink messages to an address to which the gateways subscribe. Similarly, downlink traffic can be submitted or injected into the mesh network via a single or multiple gateways. In case a single gateway is used, the gateway selection can, for example, be based on the distance from the end node to the gateways (often counted in terms of number of hops).

Existing mesh gateway architectures are in most cases optimized for physical, on-premise deployments. In general, all the gateway functionality is implemented in a physical gateway node, which is deployed and located on site, and logics and algorithms running in the gateways are using local information, available in the respective physical gateway nodes, as input. Typically, each gateway node is associated with a unique (mesh) unicast network address. When the mesh network is not IP-based, such as with Bluetooth Mesh™, the gateway node typically has to perform protocol translation between the mesh network and an IP-based network, for example. Accordingly, gateways for providing cloud connectivity to a network of communicatively interconnected network nodes may have to support and implement particular and sometimes multiple protocol stacks.

Hence, existing mesh gateway architectures, designed for deployment and information processing in specific types of networks, lack flexibility, scalability, and efficiency for usage with multiple network technologies. The existing mesh gateway architectures and gateway relay nodes are therefore cumbersome and tedious to provision, maintain, and upgrade.

Accordingly, there is a need for a more versatile and easy to deploy and maintain gateway architecture for providing cloud connectivity to plural types of networks of communicatively interconnected network nodes, operating in accordance with a plurality of communication protocols and technologies. The improved gateway architecture has to be technically and economically advantageous in terms of efficiency and scalability, and has to improve robustness of the network against gateway failures.

SUMMARY

The above mentioned and other objects are achieved, in a first aspect of the present disclosure, by a gateway arranged for providing cloud connectivity to a network of communicatively interconnected network nodes, comprising:
- a backend function, and
- a plurality of frontend devices, for deployment in the network, which frontend devices communicatively connect to the backend function, and each comprise a transceiver for exchanging messages between a network node and the backend function. The backend function being common to the plurality of frontend devices and arranged in a at least one server of a plurality of operatively connected servers, and configured for processing of the messages for exchange thereof with the cloud.

The gateway architecture according to the proposed solution distinguishes between frontend functionality and backend functionality. The frontend functionality is comprised by a plurality of physical frontend devices, arranged for deployment in the network of communicatively interconnected nodes, for exchanging messages between the network nodes and the backend functionality. The backend functionality is provided by a backend function that is part of the cloud and operates in common for the plurality of frontend devices. That is, uplink messages received by the backend function from a network node via a physical frontend device are processed by the backend function for exchange with the Internet, while downlink messages received from the Internet are processed by the backend function for exchange with a network node via a physical frontend device.

In accordance with the proposed solution, the backend functionality is configured in at least one server of a plurality of operatively connected servers. Such a plurality servers may operate remote from the network of communicatively interconnected network nodes and may form a pool of configurable resources. This pool of resources providing the backend function may form part of the cloud to which the gateway provides connectivity. Hence, the backend function of the gateway architecture according to the present disclosure may also be termed a 'virtual gateway architecture' or 'cloud based architecture'.

Operating the backend functionality in a virtual or cloud environment provides significant advantages, such as but not limited to:
- None or very limited configuration needed in the physical frontend devices. Instead, most or all configuration may be configured and performed by the common backend function, where it can easily be maintained and upgraded. Furthermore, it is possible to perform all provisioning (re-provisioning) of the virtual gateway in the common backend function.
- Easier to reuse a same physical frontend device in different networks. It is flexible to configure a frontend device in different mesh networks and/or with different network addresses. Additional physical frontend devices can easily be deployed as the mesh network expands, providing enhanced scalability.
- Once a message is received by one frontend device, the information is also available to the common backend and can be used to take actions for any of the physical frontend devices.
- Support for 'thin' physical frontend devices, in which the functionality of the physical frontend is limited to a bare minimum, i.e. in principal to suitable transceiver hardware. This enables simple (hardware) replacement of physical frontend devices.

Compared to on-premise deployments of gateways, the virtual or cloud-based gateway solution according to the present disclosure provides the intended advantages of flexibility, scalability, (cost) efficiency by sharing resources and functionality, distributing backend functionality over several servers and providing redundancy thereby improving robustness, and improved security as the message processing is performed in a server or servers that can be maintained in a safe premises. Additional advantages include means for rapid deployment of new applications, easy access to information from any place, and centralized information processing, providing coordination benefits in that data received from the local nodes can be aggregated centrally.

The solution according to the present disclosure further contributes to the present trend in communication and data processing of moving from local, on-premise deployments to cloud-based solutions. A trend that is expected to continue to grow and develop even further in future.

In accordance with the present disclosure, in a further embodiment thereof, processing of the messages by the backend function for exchange thereof with the cloud comprises communication protocol processing.

The Bluetooth Mesh™ functionality, for example, is based on a layered protocol stack, defining seven different protocol layers, in upward direction of the protocol stack, known as the bearer layer, the network layer, the lower transport layer, the upper transport layer, the access layer, the foundation model layer and the model layer, respectively. The network and transport layers are essential for network design and deployment strategies.

Although frontend devices carrying a minimum of hardware may be preferred, in accordance with the present disclosure, a frontend device of the gateway may be arranged for performing part of the protocol processing. In a network communication protocol stack, the interface between a physical frontend device and the common backend function may be placed between the bearer layer and the network layer or between the network layer and the lower transport layer or somewhere in between. The physical frontend devices may perform part of the network layer processing. The positioning or definition of the interface determines what processing has to be performed in the physical frontend devices and in the common backend, respectively. It also influences what type of data units are exchanged between the physical frontends and the common backend, as well as the amount of traffic exchange.

In network communication protocols wherein the messages between a network node and the backend function are exchanged in the form of protocol data units, PDUs, protocol processing comprises adapting the PDUs in accordance with a particular communication protocol used by a network node, such as Bluetooth Mesh™. Different instances of a network stack may be implemented in the common backend function and shared between different frontend devices. The instances in the backend function can either belong to the same or different networks of communicatively interconnected node devices.

Placing the interface between the network layer and the lower transport layer, for example, increases the protocol processing at the physical frontends in that the physical frontend devices have to check the network ID, de-obfuscate, decrypt, and authenticate the network PDU, for example. It is advantageous to let the physical frontends inspect at least the network ID, which is sent in clear text in the network PDU and to only forward to the common backend messages with a matching network ID and that are destined to the virtual gateway. An advantage with this solution is that the traffic over the interface decreases. When forwarding messages to the common backend function, besides the mandatory message source and destination addresses, among which a physical frontend device identification uniquely identifying a physical frontend device, some additional information may have to be tagged along, for example.

Information of messages received by a frontend device is available to the common backend function and can be advantageously used, in accordance with another embodiment of the present disclosure, to avoid processing of duplicated messages received from the frontend devices.

Downlink messages from the common backend function may be transmitted to one or several of the physical frontend devices for submission or injection into the network of communicatively interconnected network nodes. Functionality in the common backend may determine algorithmically which of the physical frontend devices should be used to submit a message into the network. The backend function may utilize uplink network PDUs to determine which physical frontend device or devices should be used to inject into the network messages destined to a network end node. If messages from an end node are delivered to the common backend function from a single physical frontend, the common backend may determine to use the same physical frontend device for injecting messages to the end node in the network. If messages from a network end node are delivered to the backend function via several different physical frontend devices, the backend function may, for example, analyse the message TTL (Time To Live) field, and use the physical frontend device to which the end node has the fewest number of hops.

Accordingly, in another embodiment of the gateway of the present disclosure, the backend function is arranged for exchanging uplink and downlink messages between a network node and the backend function through different frontend devices.

Messages between the gateway and the network nodes may be communicated in a so-called flooding mode or in a routing mode of operation. In routing networks, (unicast) messages are delivered from source to destination via a specific, optimized path. To find a good path different solutions are feasible and used in practice, among others dependent on the type of communication network used.

For operation in a flooding mode, in accordance with an embodiment of the present disclosure, a common network address may be allocated to the gateway.

This common network address may be one of a unicast address or a network address available for subscription.

In a flooding mode of operation, end nodes in the network that send uplink messages simply addresses the messages to the address of the gateway, either its unicast address or to an address to which the virtual gateway subscribes. Such a message can be received by one or multiple physical frontend devices that forward the message to the common backend function. Note that a single physical frontend may often receive multiple copies of the same messages, delivered over different paths in the network.

Downlink messages sent to end nodes in flooding networks can be submitted into the network through a single or multiple physical frontend devices. Messages destined to a unicast address may typically be submitted to the network through the physical frontend device that is closest to the respective end node, while multicast messages may be submitted through several or even all physical frontend devices. It is, however, also possible to submit unicast messages through several physical frontends, as well as submitting multicast messages through a single physical frontend device.

In accordance with the present disclosure, one or more of the frontend devices may connect to the backend function via one of a wireless or a wired data communication link, for example via a wireless Wi-Fi connection, a connection in accordance with a 3GPP standard, a Bluetooth Mesh™ connection, a wired Ethernet connection, etc.

In a second aspect the present disclosure relates to a method for providing cloud connectivity to a network of communicatively interconnected network nodes, the method comprising:
  exchanging messages between the network nodes and a gateway backend function through a plurality of gateway frontend devices deployed in the network, and
  processing the messages, by the gateway backend function, for exchange thereof with the cloud.

In accordance with the present disclosure, processing of the messages may comprise communication protocol processing, part of which may be performed in a gateway frontend device, as described above.

In a third aspect the present disclosure relates to a gateway frontend device, arranged for deployment in a network of communicatively interconnected network nodes, which gateway frontend device is arranged for providing cloud connectivity in accordance with the gateway and method of the first and second aspect of the present disclosure, respectively.

In a fourth aspect of the present disclosure there is provided a computer readable storage medium, comprising computer program code instructions which, when loaded on to one or more servers of a plurality of operatively connected servers, are arranged for operating as a backend function in accordance with the gateway and method of the first and second aspect of the present disclosure, respectively.

DETAILED DESCRIPTION

Figure 1:
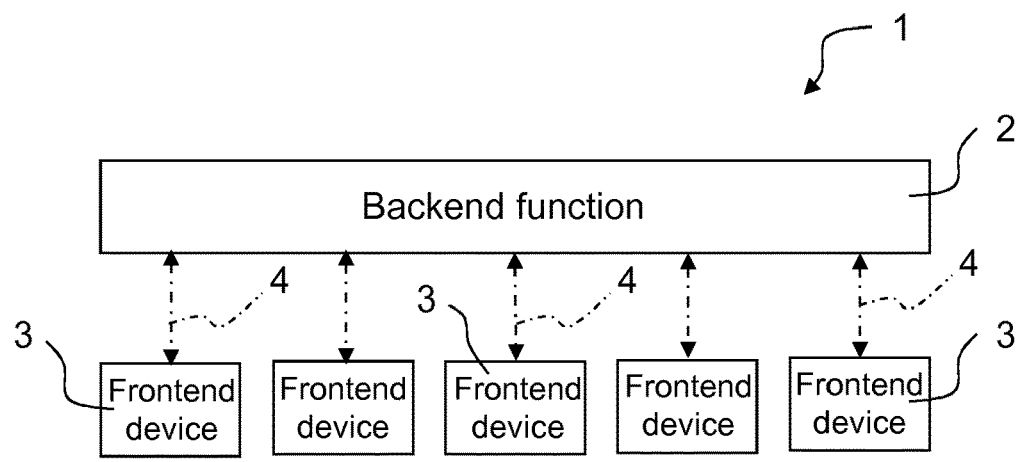
FIG. 1 illustrates, schematically, a gateway architecture in accordance with the present disclosure.

In FIG. 1, reference numeral 1 indicates a gateway architecture in accordance with the present disclosure, arranged for providing cloud connectivity to a network of communicatively interconnected network nodes. In the present description and the claims the term 'cloud' is used as a general reference to the Internet, a telecommunication core system, or any other data communication system external to the network of communicatively interconnected network nodes.

The gateway 1 comprises a backend function 2 and a plurality of frontend devices 3 for deployment in the network. The backend function 2 and the frontend devices 3 are configured for exchanging data messages and communicatively connect via a wireless or wired data communication connection 4, such as but not limited to a Wi-Fi connection, a wireless communication connection in accordance with a 3GPP standard, a Bluetooth Mesh™ connection, a wired Ethernet connection, etc., indicated by dashed-dotted arrows.

In accordance with the present disclosure, the backend function 2 operates in common to the plurality of frontend devices 3 and is arranged in a at least one server of a plurality of operatively connected servers, and is configured for processing of the data messages for exchange thereof with the Internet.

Figure 2:
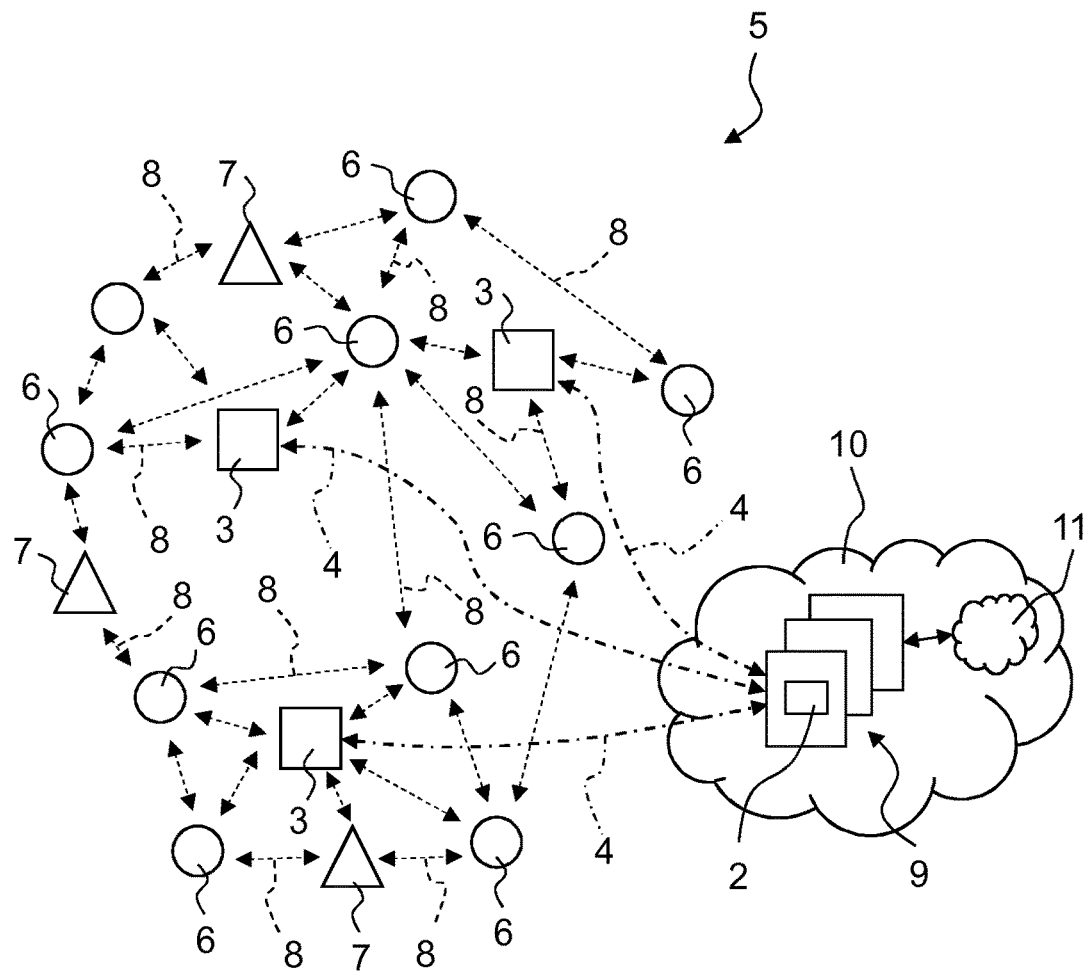
FIG. 2 illustrates, schematically, the gateway of FIG. 1 deployed in a network of communicatively interconnected network nodes, in accordance with the present disclosure.

FIG. 2 illustrates, schematically, the gateway 1 of FIG. 1 deployed in a network 5 of communicatively interconnected network nodes 6, 7 in accordance with the present disclosure.

By way of example, the network 5 shown in FIG. 2 is configured as a so-called wireless mesh network, also commonly called Wireless Personal Area Network, WPAN, comprised of multiple network end nodes 6 and relay nodes 7, such as bridges, switches and other electric infrastructure devices, for example lighting devices. The wireless communication connections between the network nodes 6, 7 are indicated by dashed arrows 8. Those skilled in the art will appreciate that in a general network architecture, the nodes 6, 7 may also connect by wired communication links.

The network end nodes 6 are generic for supporting data communication of a large number of devices, either mobile or movable devices and/or non-mobile or stationary devices. The devices may comprise, for example, equipment for mobile telephone and data communication, Customer-Premises Equipment, CPE, and Internet of Things, IoT, devices, sensors, such as for measuring humidity, temperature, IR radiation, $CO_N$, and actuators, alarm systems, etc. A node 6 may be battery operated, for example.

The network relay nodes 7 bridge the communication distance between neighbouring network end nodes 6 if wireless transceiver devices of such end nodes 6 are not capable of maintaining a direct communication connection 8 between the end nodes 6, for example. It is noted that network relay nodes 7, besides extending the network, may support communication devices.

The physical frontend devices 3 of the gateway 1 are deployed in the network 5 and are configured for exchanging data messages with one or several of the network nodes 6, 7 in their neighbourhood, using the same or a different transmission technology. Preferably, the physical front end devices 3 are configured to operate using the same communication connection or communication technology 8 as applied by the network nodes 6, 7, such as but not limited to a Wi-Fi connection, a wireless communication connection in accordance with a 3GPP standard, a Bluetooth Mesh™ connection, a wired Ethernet connection, etc.

The backend function 2 is configured in at least one server of a plurality of operatively connected servers 9. Such a plurality servers 9 may operate remote from the network 5 and may form a pool of configurable resources, designated by the tem 'cloud' or 'cloud computing' or 'virtual computing'. In the example shown, it is assumed that the servers 9 form part of a same cloud to which the gateway 1 has to provide data connectivity for the network 5, indicated by reference numeral 10.

The servers 9 may be configured for processing and exchanging messages with the Internet 11, for example, forming part of the cloud 10, using any suitable communication protocol known to the skilled person. In this manner, the gateway 1 provides Internet connectivity to the network nodes 6, 7. It will be appreciated that the cloud 10 may comprise other data communication systems for the exchange of data with the network 5, such as telecommunication core system, for example an IP Multimedia Subsystem, IMS, and that the servers 9 may be arranged for operating with such other data communication systems. It geos without saying that the servers 9 comprise one or more programmable data processors, working memory, data storage facilities and data transmission facilities, as known to the person skilled in the art.

Messages that are generated in a network end node, and sent to a gateway, are generally referred to as uplink messages or uplink traffic. Similarly, messages that are sent from a gateway to a mesh end node are referred to as downlink messages or downlink traffic.

Operating the backend functionality in a virtual or cloud environment 10 provides significant advantages in terms of deployment flexibility, scalability, (cost) efficiency by sharing resources and functionality, improved robustness by distributing backend functionality over several servers thereby providing redundancy, and improved security as the message processing is performed in a server or servers 9 that can be maintained in a safe premises, as elucidated in the Summary section above.

Figure 3:
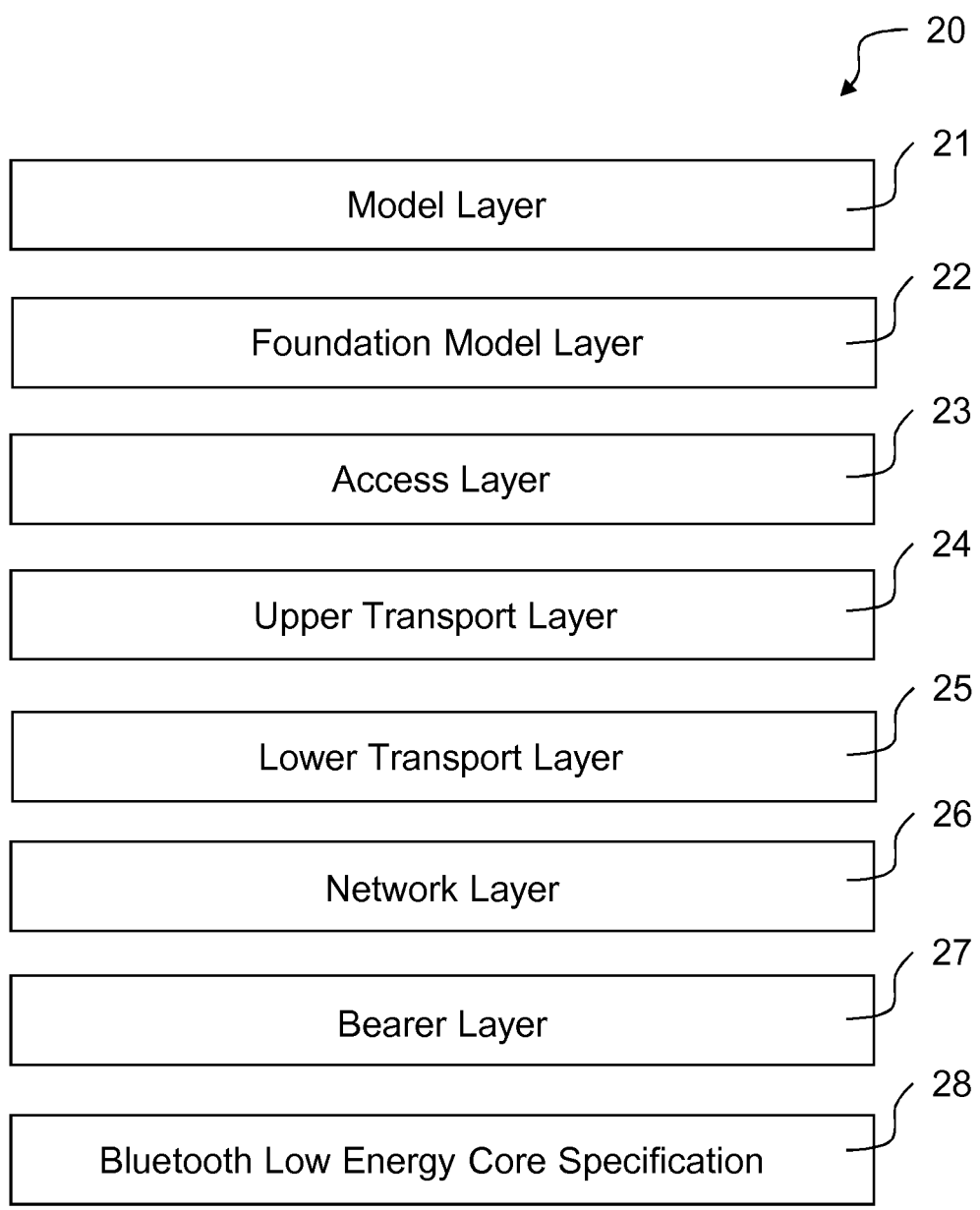
FIG. 3 illustrates, by way of example, a Bluetooth Mesh™ protocol stack.

FIG. 3 shows the Bluetooth Mesh™ protocol stack 20. Bluetooth Mesh™ is a highly anticipated addition to the Internet of Things, IoT, connectivity space. Bluetooth is a widely used short-range technology found in smartphones, tablets and consumer electronics. Bluetooth Mesh™ standardizes a full stack connectivity solution for mesh networking, extending Bluetooth applicability for IoT use cases. Seven different protocol layers have been defined. They are known as the bearer layer 27, the network layer 26, the lower transport layer 25, the upper transport layer 24, the access layer 23, the foundation model layer 22 and the model layer 21. The Bluetooth Mesh™ protocol stack 20 is built on the Bluetooth Low Energy Core Specification 28. Each layer has its own functions and responsibilities, and provides certain services to the layer above it.

The network and transport layers are essential for network design and deployment strategies. The network layer handles aspects such as the addressing and relaying of messages, as well as network layer encryption and authentication. The lower transport layer handles segmentation and reassembly, and provides acknowledged or unacknowledged transport of messages to the peer device at the receiving end. The upper transport layer encrypts and authenticates access messages, and defines transport control procedures and messages.

Full details on the layers and their functionalities are available from the Bluetooth Mesh specification Bluetooth SIG, 2017, 'Bluetooth Mesh Profile Specification', https://www.bluetooth.com/specifications/mesh-specifications and from the Bluetooth SIG, 2016, 'Bluetooth Core Specification', v5.0, at https://www.bluetooth.com/specifications/bluetooth-core-specification.

Assume that the frontend devices 3 and the network nodes 6, 7 of the network 5 communicate in accordance with the Bluetooth Mesh™ protocol. The interface between a physical frontend device 3 and the backend function 2 of the gateway may be placed either between the bearer layer 27 and the network layer 26, between the network layer 26 and the lower transport layer 25, or somewhere in between. The definition of the interface determines what processing has to be performed in the physical frontend devices 3 and in the backend function 2, respectively. It also influences what type of data units that are sent between the physical frontend devices 3 and the backend function 2, as well as the amount of traffic exchange.

When the interface is defined between the bearer layer 27 and the network layer 26, the communication between the physical frontend devices 3 and the backend function 2 will be in the form of network Protocol Data Units, PDU. To facilitate appropriate processing in the backend function 2, uplink network PDUs are tagged with additional information, such as a physical frontend device identifier. A physical frontend device forwards all network PDUs to the backend function 2 for processing, independent of the content of the network PDU header, such as the network ID, and the source and destination address of the network PDU. Accordingly, the backend function 2 performs all the network layer functions, including determination of the network ID, de-obfuscation, decryption, and authorization of the network PDU. The backend function discards all PDUs but the ones that are directed to the gateway 1, that is all messages but the ones sent to the gateway unicast address or to addresses to which the gateway 1 subscribes.

For downlink messages, the backend function 2 prepares the network PDU, including obfuscation, encryption and authentication, as described by the Bluetooth Mesh™ specification. The network PDU is sent to one or several of the physical frontend devices 3, which submit the network PDU into the mesh network 5 over the appropriate mesh bearer(s). The backend function 2 may utilize uplink network PDUs to determine which physical frontend device(s) 3 should be used to submit messages to an end node 6 in the network 5. If messages from an end node 6 are delivered to the backend function 2 from a single physical frontend device 3, the backend function 2 may determine to use the same physical frontend device 3 for submitting or injecting messages to the respective end node 6 in the network 5.

If messages from an end node 6 are delivered via several different physical frontend devices 3, the common backend function 2 may, for example, analyze the message Time To Live, TTL, field, and use the physical frontend device 3 to which the respective end node 6 has the fewest number of hops.

In Bluetooth Mesh™, messages are authenticated and encrypted using two types of security keys. A network layer key provides security for all communication within the mesh network, and an application key is used to provide confidentiality and authentication of application data sent between the intended devices or network nodes. Placing the interface between the bearer layer 27 and the network layer 26 limits the functionality and processing required in the physical frontend devices 3. Furthermore, this solution does not require that any keys are distributed to the physical frontend devices 3, such that these frontend devices 3 may have a thin as possible hardware and software design.

Placing the interface between the network layer 26 and the lower transport layer 25 increases the protocol processing at the physical frontend devices 3, as in this case the physical frontend devices have to check the network ID, de-obfuscate, decrypt, and authenticate the network PDU. Only messages with a matching network ID and that are destined to the gateway 1 are forwarded to the common backend function 2. Accordingly, an advantage with this solution is that the traffic over the interface decreases compared to placing the interface between the bearer layer 27 and the network layer 26. When forwarding messages to the backend function 2, additional information has to be tagged along like message source and destination addresses, TTL, and the Control (network control message indication), CTL, field.

Yet another option is to let the physical frontend devices 3 perform parts of the network layer processing. For example, it is advisable to let the physical frontend devices 3 inspect at least the network ID, which is sent in clear text in the network PDU, and only forward network PDUs with a matching network ID to the backend function 2.

As already indicated in the Background section above, dependent on the network communication protocol, messages in a mesh network are routed along a specific path from source to destination by hopping from node to node, or use is made of the so-called message flooding, wherein a message on its way from source to destination is multiple times rebroadcasted by a subset of the nodes, in accordance with an intelligent control algorithm.

Bluetooth Mesh™ uses a publish-and-subscribe message exchange model for data communication within the network. Nodes that generate messages publish the messages to an address, and nodes that are interested in receiving the messages will subscribe to such an address. This allows for flexible address assignment and group casting.

Flooding is the most straightforward way to propagate messages in a network using broadcast. When a network node or frontend device transmits a message, that message may be received by multiple relays that in turn forward it further. Bluetooth mesh includes rules to restrict devices from re-relaying messages that they have recently received and to prevent messages from being relayed through many hops. End nodes in a flooding mesh that send uplink messages, addresses the message to the address of the virtual gateway 1, either its unicast address or to an address to which the virtual gateway 1 subscribes. Such a message can be received by one or multiple physical frontend devices 3 that forward the message to the backend function 2. Note that a single physical frontend 3 may often receive multiple copies of the same messages, delivered over different paths in the network 5.

Figure 4:
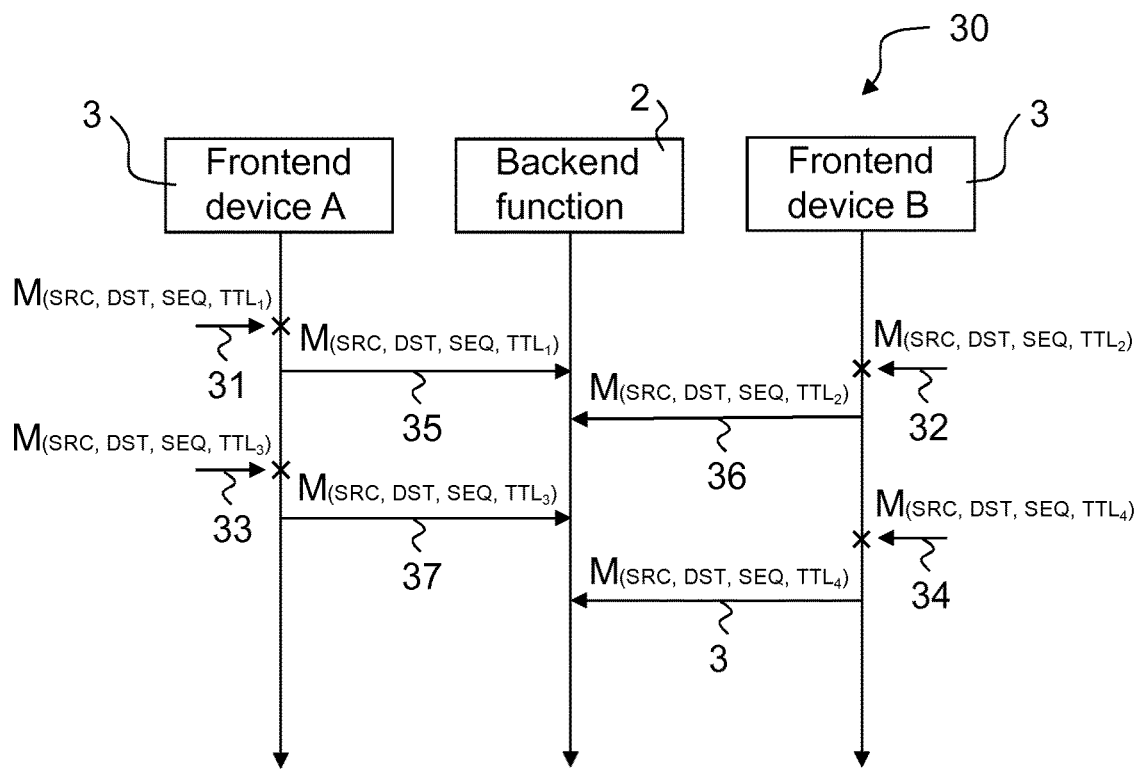
FIG. 4 illustrates an example of uplink message flow to the gateway in a network of communicatively interconnected network nodes operating in a flooding mode communication mode, in accordance with the present disclosure.

FIG. 4, by way of example, shows a sequence 30 of uplink messages in the Bluetooth Mesh™ network 5, assuming that the interface between the frontend devices 3 and the backend function 2 is placed between the bearer 27 and the network protocol layer 26. In this example, the two frontend devices A and B both receive copies of a same message M(SRC, DST,SEQ,$TTL_i$). The message M is uniquely identified by the source address, SRC, destination address, DST, and the sequence number, SEQ. The TTL of the different message copies may however differ. The TTL of a respective message copy i is indicated by $TTL_i$, with i=1, 2, 3, . . . In the sequence diagram of FIG. 4, sequence timing increases from the top to the bottom, i.e. indicated by the vertical arrow lines.

In the example shown, frontend device A first receives message copy 31 and receives message copy 33 at a point in time later than message copy 31. Frontend device B receives message copy 32 at a point time between the receipt of the message copies 31 and 33 at frontend device A. Frontend device B eventually also receives message copy 34. All the messages 31, 32, 33, 34 received are forwarded by the respective frontend device to the common backend function 2, indicated by reference numerals 35, 36, 37, 38, respectively. Accordingly, in this example all messages, i.e. network PDUs, are forwarded from frontend devices 3, i.e. A, B, to the backend function 2, and the backend 2 is configured for handling message duplicate detection as well as all network layer processing.

If network end nodes adjust the initial message TTL based on the estimated distance (in terms of number of hops) to the virtual gateway 1, the distance estimate will typically reflect the distance to the closest physical frontend device 3. TTL optimization must be re-calibrated at a regular basis to adapt to topology changes caused by, for example, network node mobility or network node failures. Such TTL re-calibration must, however, be performed independent whether a virtual gateway solution is employed or not.

Downlink messages sent to network end nodes 6 in flooding mesh networks can be submitted into the network through a single or multiple physical frontend devices 3. Messages destined to a unicast address can typically be injected through the physical frontend 3 that is closest to the network end node 6, while multicast messages can be injected through several or even all physical frontends. It is, however, also fully possible to inject unicast messages through several physical frontends, as well as injecting multicast messages through a single physical frontend.

In routing mesh networks, (unicast) messages are delivered from a source to a destination via a specific, optimized path. To find a good path to the destination, a source node typically floods the network with a special control message, which content indicates the quality of the path over which the message has traversed. The quality of the path is often referred to as the path metric, and the path metric is updated by each network node that the message passes along the way from the source to the destination. By studying the different control messages that arrive at the destination node over different paths, the destination node can estimate and select the most suitable path. The destination node signals the path selection back to the source node, and to all the nodes along the path, in a response control message. Once the response message arrives at the source node the path is established and the message can be sent.

Here, the flooding message exploring different paths is referred to as a path request, PREQ, message while the response from the destination node is referred to as a path reply, PREP, message. Different routed mesh networks make use of similar solutions to establish routes, however, naturally the procedures may different with regards to certain details and the naming of the control messages is different.

A network end node 6 that needs to set up a route to a virtual gateway 1 simply floods the network 5 with a PREQ message, with a virtual gateway unicast address in the field indicating the desired destination. The PREQ message is received by one or several of the physical frontend devices 3, which all forward the respective copies to the common backend function 2 of the gateway 1. Note that it can often happen that a physical frontend device 3 receives several instances of the PREQ message, instances that are delivered over different paths in the mesh network. By analyzing the content of the respective PREQ messages, the common backend function 2 determines which route is most suitable, for example in terms of shortest paths. This includes selection of physical frontend devices 3 in case several physical frontend devices 3 receive the route request. The common backend function 2 then replies by sending a PREP message, a message that is injected into the network 5 through the selected physical frontend device 3.

Routes in routed mesh network must regularly be validated; both to assure that the route is still operational, but also to evaluate if a new, more suitable route may have appeared. For example, if the route is no longer available since the serving physical frontend device 3 is no longer operational, the source end node may try to establish a new route and by doing so it will set up a route to another physical frontend device 3.

Paths for downlink unicast messages can be established in a few different ways. If an uplink route to a particular physical frontend device 3 has been established, the PREQ message may be injected into the network 5 through this particular physical frontend. Alternatively, the PREQ message can be injected into the network 5 through several or even all the physical frontend devices 3. In such a way, all network entry points are explored. The network end node 6 selects the most suitable path and sends a response, PREP, back via the network nodes making up the path, and finally reaching the most suitable physical frontend device 3. After the route has been established, the common backend function 2 continues to inject downlink messages destined to this specific end node via the selected physical frontend device 3.

Those skilled in the art will appreciate that the above example relating to a Bluetooth Mesh™ protocol stack, is in a comparable manner applicable to other network communication protocol stacks. By selecting the interface between a physical frontend device 3 and the common backend function 2 as low as possible in a particular protocol stack, the data processing functionality to be performed in a physical front end device 3 can be kept to a minimum as possible, thereby enabling relatively simple (hardware) replacement of physical frontend devices 3.

Figure 5:
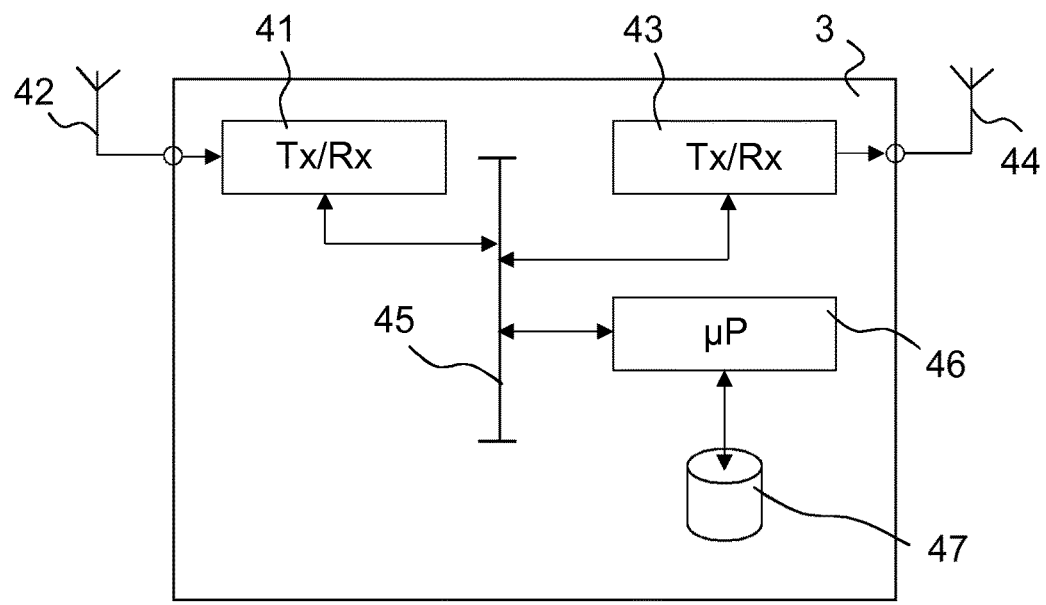
FIG. 5 illustrates, schematically, a circuit diagram of a physical front end device of the gateway in accordance with the present disclosure.

FIG. 5 shows, schematically, a circuit diagram of an embodiment of a gateway frontend device 3 for operating with a gateway backend function 2 of the gateway architecture 1 in accordance with the present disclosure, see FIG. 1. The frontend device 3 comprises a first transceiver, Tx/Rx, 41, arranged for wirelessly 42 exchanging data messages with a network node in a network 5 of communicatively interconnected network nodes 6, 7, and a second transceiver Tx/Rx 43 for wirelessly 44 exchanging data messages with the backend function 2 of the gateway architecture 1. The transceivers 41, 43 may be configured to operate in accordance with a same data communication connection technology or different data communication connection technologies, such as but not limited to wireless Wi-Fi connection, a connection in accordance with a 3GPP standard, a Bluetooth Mesh™ connection, etc. One or both of the transceivers 41, 43 may also operate for data transmission over a wired connection, such as an Ethernet connection, for example. In another embodiment, the transceivers 41, 43 may be combined into a single transceiver.

Dependent on the amount of data processing required by the frontend device 3, a data processor 46 and a data memory or data storage may be provided with the frontend device 3. The transceivers 41, 43, and the processor 46 and storage 47 interact via a data communication bus 45.

As will be appreciated by those skilled in the art, frontend devices 3 may connect to plural backend functions 2 of different virtual gateways 1, whether or not providing connectivity to a same or different clouds 10, whereas frontend devices 3 deployed in different networks 5 may connect to a same backend function 2, for example.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A gateway, arranged for providing cloud connectivity to a network of communicatively interconnected network nodes, said gateway comprising:
   a backend function;
   a plurality of frontend devices, for deployment in said network, wherein
   one or more different instances of a network stack are implemented by the backend function and are shared between different frontend devices,
   the backend function is arranged in at least one server of multiple operatively connected servers and is configured for processing messages for exchange with cloud,
   said frontend devices are communicatively connected to said backend function,
   each frontend device comprises a transceiver for exchanging messages between a network node and said backend function, and
   said backend function is common to said plurality of frontend devices and arranged in at least one server of a plurality of operatively connected servers and configured for processing of said messages for exchange thereof with a cloud, wherein exchanging the messages comprises:
   at least one of the frontend devices receiving an uplink (UL) data packet; and
   said at least one of the frontend devices forwarding the received UL data packet towards the backend function independent of information included in a header of the UL data packet.

2. The gateway according to claim 1, wherein said processing of said messages for exchange thereof with the cloud comprises communication protocol processing.

3. The gateway according to claim 2, wherein
   said messages are exchanged between the network node and said backend function in the form of protocol data units (PDUs) and
   said protocol processing comprises adapting said PDUs in accordance with a communication protocol used by the network node.

4. The gateway according to claim 2, wherein a frontend device is arranged for performing part of said protocol processing.

5. The gateway according to claim 1, wherein said backend function is arranged for avoiding processing of duplicated messages received from said frontend devices.

6. The gateway according to claim 1, wherein said backend function is arranged for exchanging uplink and downlink messages between a network node and said backend function through different frontend devices.

7. The gateway according to claim 1, wherein a common network address is allocated to said gateway, for exchanging said messages between the network node and said gateway using said network address.

8. The gateway according to claim 7, wherein said common network address is one of a unicast address or a network address available for subscription.

9. The gateway according to claim 1, wherein one or more of said frontend devices are configured to be connected to said backend function via one of a wireless or a wired data communication link.

10. The gateway according to claim 1, wherein the backend function is configured to discard at least one message included in the messages depending on either a gateway unicast address or one or more addresses to which the gateway is subscribed.

11. The gateway according to claim 1, wherein the backend function is configured in a server.

12. The gateway according to claim 1, wherein
   the UL data packet includes a source address and a destination address, and
   the frontend devices forwarding the received UL data packet towards the backend function comprises forwarding the received UL data packet towards the backend function regardless of the source address and the destination address.

13. The gateway of claim 1, wherein the UL data packet includes an identifier identifying at least one of the frontend devices.

14. A method for providing cloud connectivity to a network of communicatively interconnected network nodes, said method comprising:
   exchanging messages between said network nodes and a gateway backend function through a plurality of gateway frontend devices deployed in said network, and
   processing said messages, by said gateway backend function, for exchange thereof with a cloud, wherein
   one or more different instances of a network stack are implemented by said gateway backend function and are shared between different gateway frontend devices,
   the gateway backend function is arranged in at least one server of multiple operatively connected servers and is configured for processing messages for exchange with cloud, and
   exchanging the messages comprises:
   at least one of the gateway frontend devices receiving an uplink (UL) data packet; and
   said at least one of the gateway frontend devices forwarding the received UL data packet towards the backend function independent of information included in a header of the UL data packet.

15. The method according to claim 14, wherein said processing of said messages comprises communication protocol processing.

16. The method according to claim 15, wherein part of said protocol processing is performed in a gateway frontend device.

17. The method according to claim 14, wherein exchanging the messages comprises:

the frontend devices receiving uplink (UL) data packet; and the frontend devices forwarding the received UL data packet towards the backend function independent of information included in a header of the UL data packet.

18. The method according to claim 14, wherein processing the messages comprises discarding at least one message included in the messages depending on either a gateway unicast address or one or more addresses to which a gateway including the frontend devices and the backend function is subscribed to.

* * * * *